United States Patent
Peczalski et al.

(10) Patent No.: US 10,520,302 B2
(45) Date of Patent: Dec. 31, 2019

(54) MONITORING THICKNESS UNIFORMITY

(71) Applicant: Honeywell International Inc., Morris Plains, NJ (US)

(72) Inventors: Andrzej Peczalski, Eden Prairie, MN (US); Fouad Nusseibeh, Champlin, MN (US)

(73) Assignee: Honeywell International Inc., Morris Plains, NJ (US)

( * ) Notice: Subject to any disclaimer, the term of this patent is extended or adjusted under 35 U.S.C. 154(b) by 167 days.

(21) Appl. No.: 15/279,862

(22) Filed: Sep. 29, 2016

(65) Prior Publication Data

US 2017/0097231 A1  Apr. 6, 2017

Related U.S. Application Data

(60) Provisional application No. 62/236,218, filed on Oct. 2, 2015, provisional application No. 62/236,227, filed on Oct. 2, 2015, provisional application No. 62/236,237, filed on Oct. 2, 2015.

(51) Int. Cl.
  *G01B 15/02*  (2006.01)
  *G01S 13/88*  (2006.01)
  *G01S 13/00*  (2006.01)

(52) U.S. Cl.
  CPC ............ *G01B 15/02* (2013.01); *G01S 13/88* (2013.01)

(58) Field of Classification Search
  CPC ........... G01B 15/02; G01B 7/06; G01S 13/88; G01S 13/89; A41H 1/02; G01N 22/04
  USPC ............................ 324/637, 642, 644; 342/22
  See application file for complete search history.

(56) References Cited

U.S. PATENT DOCUMENTS

| | | | | | |
|---|---|---|---|---|---|
| 3,490,037 | A | * | 1/1970 | Williams | G01B 15/02 324/644 |
| 3,622,874 | A | * | 11/1971 | Chasek | G01B 15/02 324/637 |
| 3,693,079 | A | * | 9/1972 | Walker | G01N 22/04 250/250 |
| 4,075,555 | A | * | 2/1978 | Wight | G01B 7/06 324/644 |
| 4,492,915 | A | * | 1/1985 | Caspers | G01B 15/02 324/637 |
| 4,675,595 | A | * | 6/1987 | Hane | G01N 22/04 324/606 |
| 4,789,820 | A | * | 12/1988 | Parrent, Jr. | G01N 22/04 324/640 |
| 5,086,279 | A | * | 2/1992 | Wochnowski | G01N 22/04 324/637 |
| 5,241,279 | A | * | 8/1993 | Boniort | G01B 15/02 324/632 |

(Continued)

*Primary Examiner* — Bernarr E Gregory
(74) *Attorney, Agent, or Firm* — Brooks, Cameron & Huebsch, PLLC

(57) ABSTRACT

Devices, methods, and systems for monitoring thickness uniformity are described herein. One system includes a transmitter configured to transmit a signal through a portion of a material while the material is moving, an attenuator configured to absorb a first portion of the transmitted signal, a reflector configured to reflect a second portion of the transmitted signal, a receiver configured to receive the reflected signal, and a computing device configured to determine a thickness of the portion of the material based on a time delay between the transmission of the signal and the reception of the reflected signal.

17 Claims, 6 Drawing Sheets

LEGEND
202 Transmitter
204 Signal
206 Belt
207 Reinforcement
208 Reflector
210 Attenuator
212 Receiver

(56) References Cited

U.S. PATENT DOCUMENTS

| | | | | |
|---|---|---|---|---|
| 6,198,293 B1* | 3/2001 | Woskov | ............... | G01B 15/02 |
| | | | | 324/637 |
| 6,531,881 B1* | 3/2003 | Cordes | ............... | G01B 15/02 |
| | | | | 324/637 |
| 7,187,183 B2* | 3/2007 | Jonsson | ............... | G01N 22/04 |
| | | | | 324/642 |
| 7,486,226 B2* | 2/2009 | Edvardsson | ............ | G01S 13/88 |
| | | | | 324/600 |
| 8,003,946 B2* | 8/2011 | Ellison | ............... | G01N 22/04 |
| | | | | 250/358.1 |
| 2004/0012398 A1* | 1/2004 | Bailey | ............... | A41H 1/02 |
| | | | | 324/644 |
| 2007/0290917 A1* | 12/2007 | Huff | ............... | G01S 13/89 |
| | | | | 342/22 |

\* cited by examiner

LEGEND 602-1 Transmitter    612-1 Antenna
602-2 Transmitter    612-2 Antenna
602-3 Transmitter    612-3 Antenna
602-4 Transmitter    612-4 Antenna
602-5 Transmitter    612-5 Antenna
602-6 Transmitter    612-6 Antenna
602-7 Transmitter    612-7 Antenna
602-8 Transmitter    612-8 Antenna
602-9 Transmitter    612-9 Antenna
606    Belt
606-1  Portion of Belt

US 10,520,302 B2

MONITORING THICKNESS UNIFORMITY

PRIORITY INFORMATION

This application claims priority to U.S. Provisional Patent Application 62/236,227, filed Oct. 2, 2015, U.S. Provisional Patent Application 62/236,237, filed Oct. 2, 2015, and U.S. Provisional Patent Application 62/236,218, filed Oct. 2, 2015, the entire specifications of which are incorporated herein by reference.

TECHNICAL FIELD

The present disclosure relates to devices, methods, and systems for monitoring thickness uniformity.

BACKGROUND

A uniform thickness of a material may be desirable in various contexts. Such contexts can include, for example, manufacturing and/or continuous line production of materials such as insulation, plastic sheets, roofing shingles, nonwoven filter material, rubber-based products (e.g., rubber with embedded magnetic material), and/or thickness measuring of tires and/or belts (e.g., conveyor belts, transmission belts, etc.), among others.

For instance, conveyor belts are used in industries such as mining, power generation, and agriculture, among others. Due to usage and/or accidents, conveyor belts can be damaged by wear or tearing.

Both excessive wear and belt tearing can result in unscheduled work stoppages. Because many industries using conveyor belts are located in remote settings, and because of the large size of their machinery, repairing a conveyor belt can take hours or days. Additionally, the lead time for acquiring a new conveyor belt can be excessive (e.g., six months). Losses for industries due to interrupted production from damaged belts may be immense.

BRIEF DESCRIPTION OF THE DRAWINGS

FIG. 7 illustrates a computing device for monitoring conveyor belt thickness in accordance with one or more embodiments of the present disclosure.

DETAILED DESCRIPTION

Figure 1:
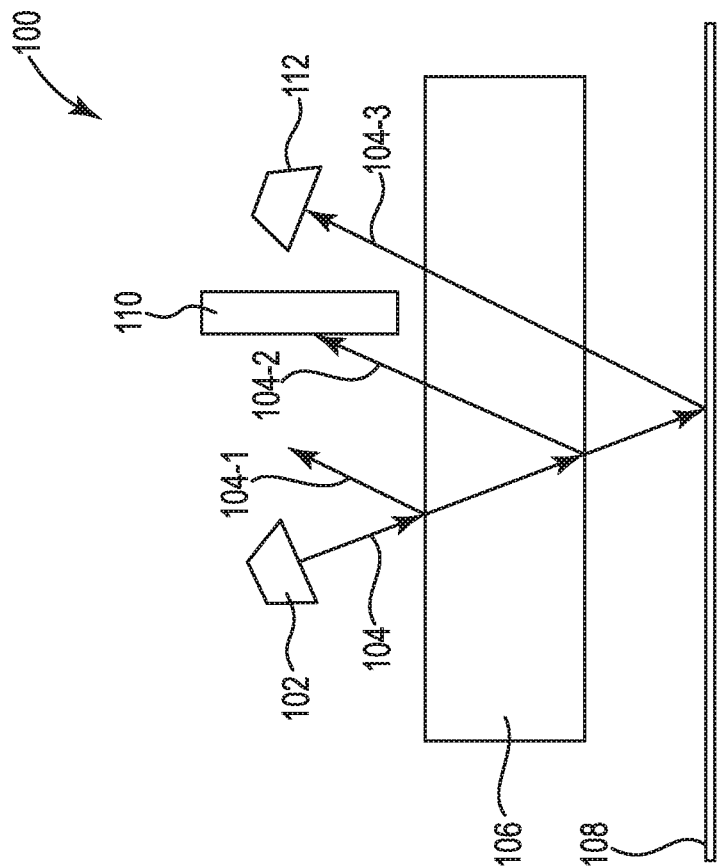
FIG. 1 illustrates a cross-sectional view of a system for monitoring conveyor belt thickness in accordance with one or more embodiments of the present disclosure.

Devices, methods, and systems for monitoring conveyor belt thickness are described herein. Embodiments of the present disclosure can detect excessive wear on a conveyor belt and estimate the remaining life of the belt (e.g., time until failure). Thus, maintenance and/or replacement of the belt can be scheduled before failure such that the production process is minimally interrupted.

Typical damage to a conveyor belt can include parabolic-shaped wear near the center of the belt, groove-shaped wear near the belt skirts, damage to the belt splice, delamination of belt layer(s), and/or hole(s) in the belt. Embodiments of the present disclosure could detect some of these types of damage and provide advance notice to maintenance personnel.

Embodiments herein can be installed in existing conveyor belt systems without changing the operation of the system. In addition to conveyor belts, embodiments herein can be applied in other contexts such as manufacturing, for instance, where a monitoring a thickness of a material may be desired. Such contexts can include, for example, continuous line production of insulation, plastic sheets, roofing shingles, nonwoven filter material, rubber-based products (e.g., rubber with embedded magnetic material), and/or thickness measuring of tires and/or other belts (e.g., transmission belts). Thus, it is noted that while the example of conveyor belts is used herein, such usage is not intended to be limiting.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a cross-sectional view of a system 100 for monitoring conveyor belt thickness in accordance with one or more embodiments of the present disclosure. As shown in FIG. 1, system 100 includes a transmitter (e.g., transmitting antenna) 102, a reflector 108, an attenuator 110, and a receiver (e.g., receiving antenna) 112. As shown, the transmitter 102, the attenuator 110 and the receiver 112 can be positioned on a first side of a conveyor belt (hereinafter "belt") 106, and the reflector 108 can be positioned on a second, opposing side of the belt 106.

The transmitter 102 can be a transmitting antenna, for instance, and can be configured to transmit a pulsed or continuous wave radar signal. The transmitter 102 is not limited to a particular type of transmitter. In some embodiments, the transmitter 102 can be a 10 GHz transmitter, though embodiments of the present disclosure are not so limited. For example, in some embodiments, frequencies between 2.4 to 77 GHz can be used. Higher frequencies may result in improved spatial and/or thickness resolution, but may be limited by attenuation with thicker materials. The transmitter 102 can be positioned at a 45-degree angle with respect to the belt 106 and/or the reflector 108, though embodiments of the present disclosure are not so limited.

The reflector 108 can include a reflective surface (e.g., a metallic surface and/or fine metal mesh), though embodiments herein to not limit the reflector to a particular type of reflector. The reflector 108 can focus and/or reflect a radar signal transmitted by the transmitter 102, for instance.

The attenuator 110 can be a device configured to attenuate (e.g., absorb) a radar signal, for instance, and can include a foam material, though embodiments of the present disclosure are not so limited. The receiver 112 can be a receiving antenna, for instance, configured to receive a radar signal. The receiver 112 is not limited to a particular type of receiver.

As shown in FIG. 1, the transmitter 102 can transmit a radar signal (hereinafter "signal") 104. The signal can be directed towards the belt 106 and towards the reflector 108 (e.g., through the belt 106). A portion of the signal 104 may be reflected before reaching the reflector 108. As shown a first portion 104-1 of the signal 104 can reflect off of a surface (e.g., a top surface) of the belt 104. A second portion 104-2 of the signal 104 can reflect off of another (e.g., bottom) surface of the belt 106.

The attenuator 110 can be positioned to attenuate (e.g., block) the reflected signals 104-1 and/or 104-2 such that they are not received by the receiver 112. Additionally, the attenuator 110 can attenuate direct interference (e.g., non-reflected interference) between the transmitter 102 and the receiver 112.

The signal 104 can pass through the belt 106 and reflect off of the reflector 108. Thereafter, the signal (shown as reflected signal 104-3) can pass back through the belt 106 and then be received by the receiver 112. Thus, the signal 104 penetrates the belt 106 twice: once before the reflection and once after the reflection. Each time the signal 104 penetrates the belt 106 its velocity is reduced. The reduction in velocity can be proportional to a square root of a dielectric constant (e.g., permittivity) of the belt 106. Additionally, the signal 104 can be attenuated proportional to an exponential function of the thickness of the belt 106.

Thus, the thickness of the belt 106 can be determined from a time delay between the transmitted and received signal 104 compared to a time delay of a reference signal obtained without penetration of the belt. Though not shown in FIG. 1 so as not to obscure embodiments of the present disclosure, a portion of the reflector 108 can extend beyond an outer edge of the belt 106. The reference signal can be obtained by transmitting the signal 104 onto the portion of the reflector 108 that extends beyond the edge of the belt 106 and receiving the reference signal by the receiver 112. In a similar manner, the thickness of the belt 106 can be determined from the attenuation of the received signal as compared to the reference signal that does not pass through the belt 106.

Since the reference RF beam that is travelling over the same distance but without the belt is required for calibration that measurement can be carried out using another receiver that is located beyond the edge of the conveyor belt 106 (e.g., such that the conveyor belt 106 is not between the other receiver and the transmitter 102). Beyond the edge of the belt the other antenna may not have the belt 106 present in the RF beam path and could be used for the calibration of the dielectric constant. It is noted that a sample portion of the belt 106 (e.g., a remnant, scrap, test sample, etc.) can be placed between the other antenna and the transmitter 102, though is not shown in FIG. 1 so as not to obscure embodiments of the present disclosure. The calibrations using the sample portion of the conveyor belt 106 and/or antennas can be carried out periodically or on a scheduled basis, for instance, to determine a dielectric constant of the belt 106 at different temperatures and/or other conditions (e.g., humidity levels, atmospheric conditions, etc.).

Embodiments of the present disclosure can calibrate the system 100 to the belt 106 using a portion of the belt 106 proximal to an edge of the belt 106. Such a portion may, for instance, experience reduced wear than a medial portion of the belt 106 and may thus act as a suitable sample for calibration purposes.

It is noted that the conveyor belt 106 is not intended to be limited to a particular type of conveyor belt. In addition, it is noted that while the example of a conveyor belt is used herein for the purposes of illustration, embodiments of the present disclosure can monitor thicknesses of objects other than conveyor belts, as previously discussed.

The thickness of the belt 106 can be determined as the belt 106 moves, for instance. In some embodiments, the system 100 (and the system 213, discussed below in connection with FIG. 2) can be affixed to a support device (not shown so as not to obscure embodiments of the present disclosure). The support device can be a frame, for instance, or other device that maintains a fixed position of the transmitter 102, the receiver 112, the attenuator 110, and/or the reflector 108. The support device can be installed such that the system 100 can be installed without interruption of the operation and/or movement of the belt 106.

Figure 2:
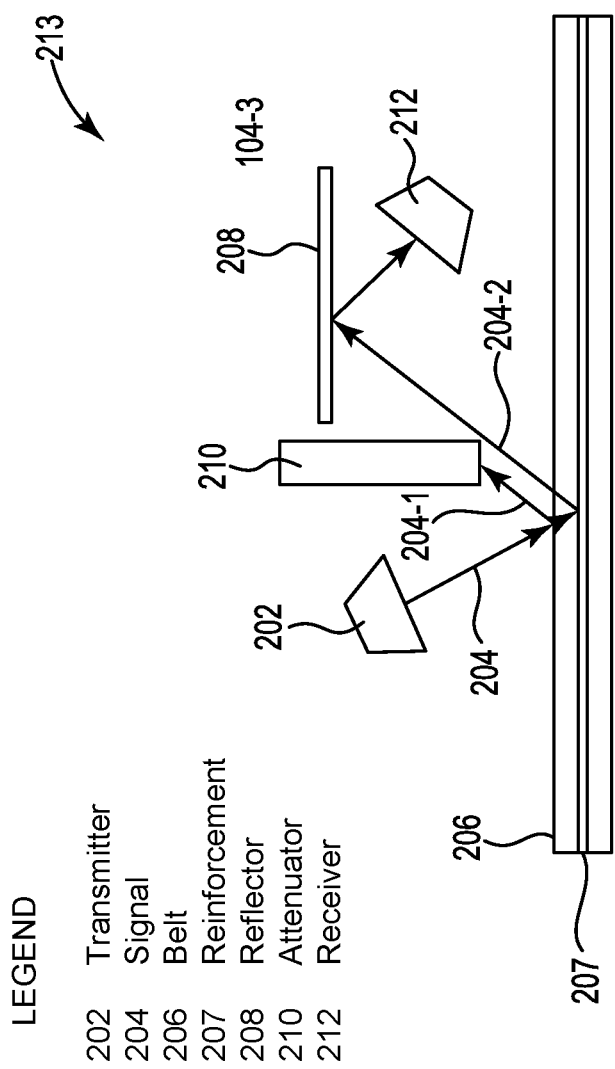
FIG. 2 illustrates a cross-sectional view of a system for monitoring conveyor belt thickness in accordance with one or more embodiments of the present disclosure.

FIG. 2 illustrates a cross-sectional view of another system 213 for monitoring conveyor belt thickness in accordance with one or more embodiments of the present disclosure. In a manner analogous to the system 100 discussed previously, the system 213 includes a transmitter 202, an attenuator 210, a reflector 208, and a receiver 212. The transmitter 202 can be positioned at a 60-degree angle with respect to the belt 206, though embodiments of the present disclosure are not so limited.

In some embodiments, the system 213 can be utilized in instances where a belt 206 includes reinforcement 207. The reinforcement 207 can include a metal layer (e.g., steel) and/or one or more metal cables therein. If, for instance, the belt 207 includes a plurality of metal cables spaced sufficiently close together such that their spacing is significantly exceeded (e.g., exceeded by a factor of 5) by a wavelength of the radar signal in the belt 206 (e.g., 1 centimeter for a 10 GHz signal and dielectric constant of 9), then the cables can reflect the signal.

As shown in FIG. 2, the transmitter 202 can transmit a signal 204. The signal can be directed towards the belt 206. A portion of the signal 204 may be reflected before reaching the reinforcement 207. As shown a first portion 204-1 of the signal 204 can reflect off of a surface (e.g., a top surface) of the belt 206.

The attenuator 210 can be positioned to attenuate (e.g., block) the reflected signal 204-1 such that it is not received by the receiver 212. Additionally, the attenuator 210 can attenuate direct interference (e.g., non-reflected interference) between the transmitter 202 and the receiver 212.

The signal 204 can pass through a top portion of the belt 206 and reflect off of the reinforcement 207. Thereafter, the signal (shown as reflected signal 204-2) can pass back through the top portion of the belt 206, reflect off of the reflector 208, and then be received by the receiver 212. In a manner analogous to that previously discussed, when the signal 204 penetrates the top portion of the belt 206 its velocity is reduced. The reduction in velocity can be proportional to a square root of a dielectric constant (e.g., permittivity) of the belt 206. Additionally, the signal 204 can be attenuated proportional to an exponential function of the thickness of the belt 206.

Thus, the thickness of the top portion of the belt 206 can be determined from a time delay between the transmitted and received signal 204 compared to a time delay of a reference signal obtained without penetration of the belt 206. Though not shown in FIG. 2 so as not to obscure embodiments of the present disclosure, a portion of the reinforcement 207 can extend beyond an outer edge of the belt 206. In some embodiments, a reference reflector can be positioned beyond an outer edge of the belt 206 at substantially a same distance from the transmitter 102 as the reinforcement 207. The reference signal can be obtained by transmitting the signal 204 onto the portion of the reinforcement 207 that extends beyond the edge of the belt 206 (or the reference reflector) and receiving the reference signal by the receiver 112. In a similar manner, the thickness of the belt 206 can be determined from the attenuation of the received signal as compared to the reference signal that does not pass through the belt 206.

Figure 3:
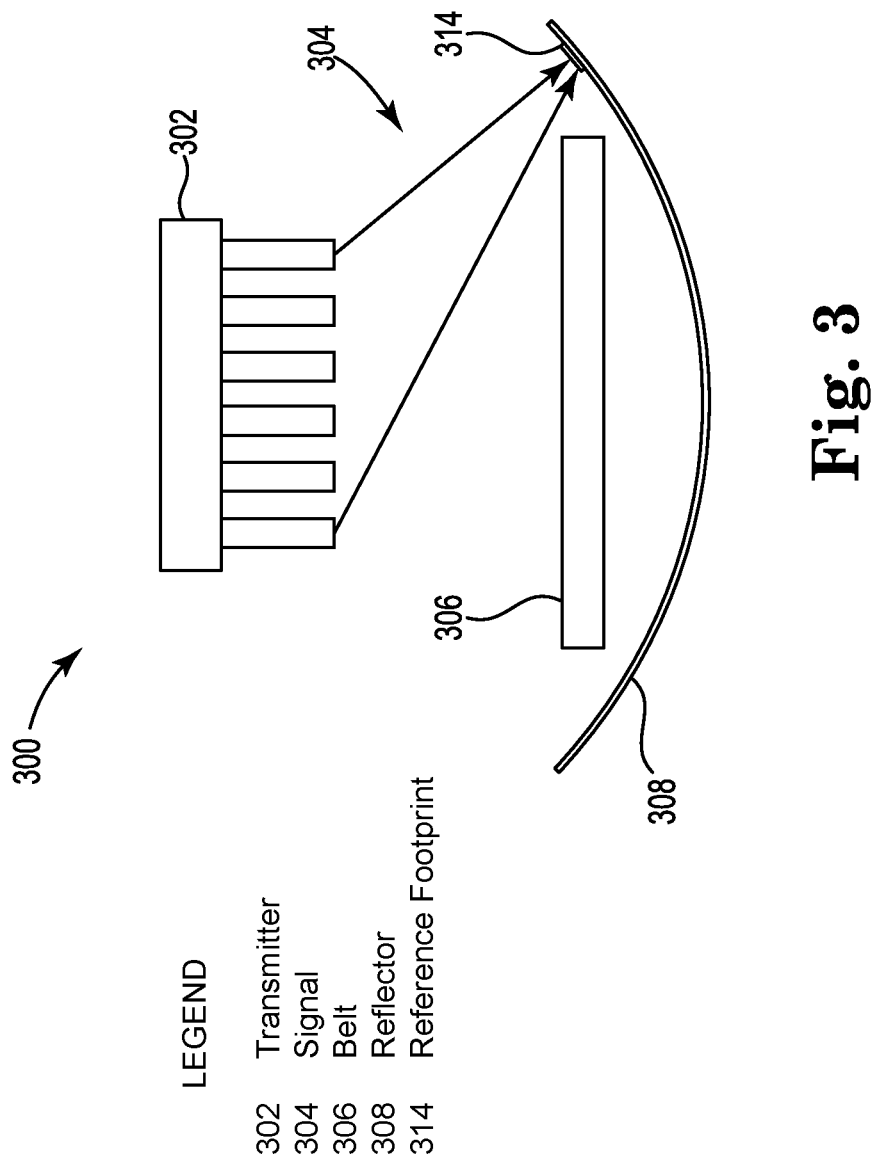
FIG. 3 illustrates a different cross-sectional view of a portion of the system illustrated in FIG. 1 in accordance with one or more embodiments of the present disclosure.

FIG. 3 illustrates a different cross-sectional view of a portion of the system 100 illustrated in FIG. 1 (illustrated as system 300 in FIG. 3). The system 300 can be analogous to the system 100; for instance, the system 300 includes a transmitter 302 and a reflector 308. System 300 can additionally include a receiver and/or an attenuator though such components are not illustrated in FIG. 3 so as not to obscure embodiments of the present disclosure.

As shown in FIG. 3, the reflector 308 can have a concave configuration (e.g., shape). A radius of curvature of the reflector 308 can allow the redirection of a signal 304 towards a receiver (not shown) and can focus the reflected signal. If, for instance, the signal is not focused, some of the reflected signal (e.g., a periphery of the reflected signal) may not be collected by the receiver and thus the thickness of the belt 306 penetrated by that portion of the reflected signal would not be measured.

As previously discussed, and as shown in FIG. 3, the reflector 308 can extend beyond the edge(s) of the belt 306. The signal 304 can be directed towards the reflector 308 beyond the edge of the belt 306 striking the reflector 308 at a reference footprint 314. The signal 304 can reflect off of the reflector 308 at the reference footprint 314 towards the receiver.

Figure 4:
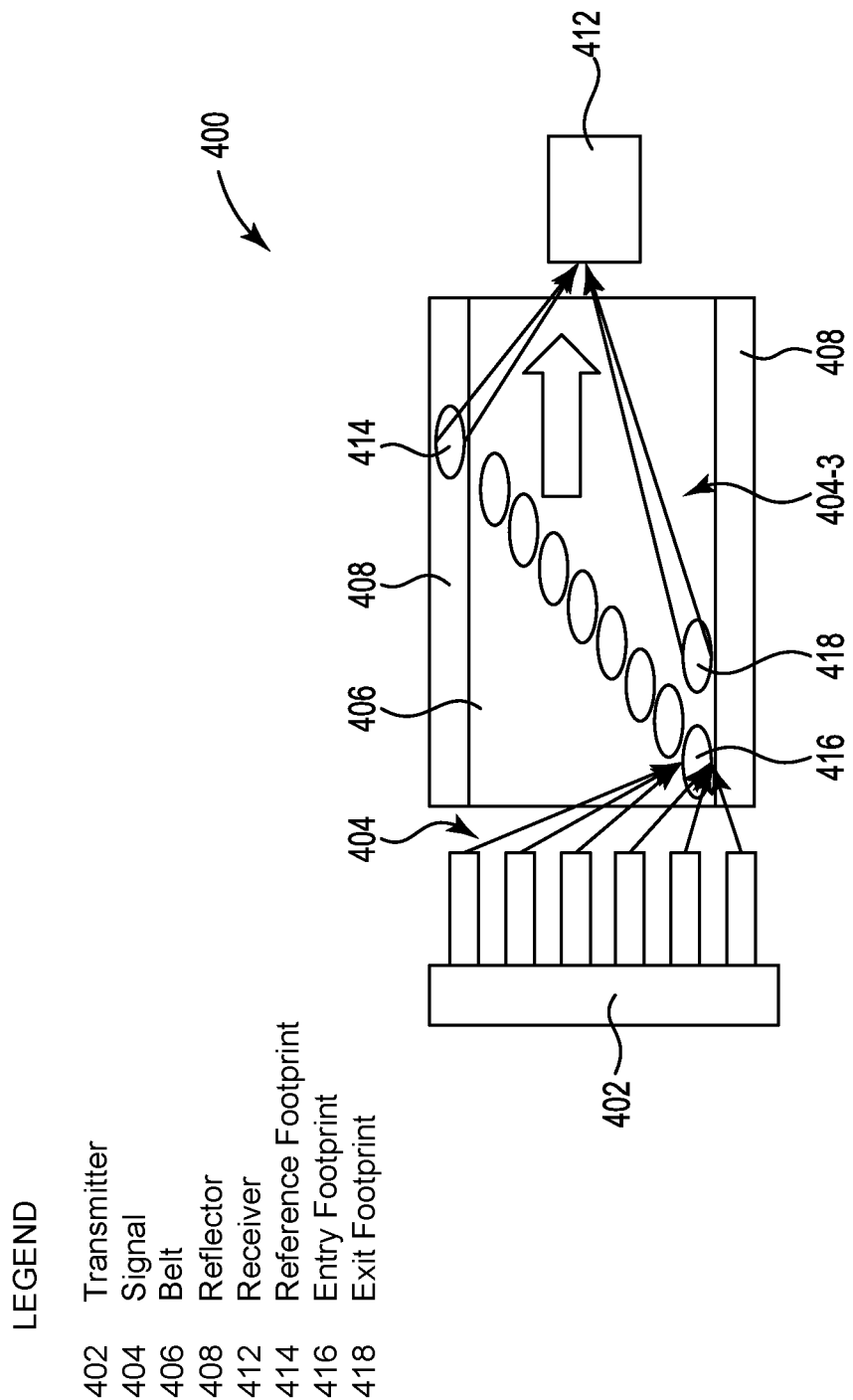
FIG. 4 illustrates a top-down view of a portion of the system illustrated in FIG. 1 in accordance with one or more embodiments of the present disclosure.

FIG. 4 illustrates a top-down view of a portion of the system 100 illustrated in FIG. 1 (illustrated as system 400 in FIG. 4). The system 400 can be analogous to the system 100 and the system 300; for instance, the system 400 includes a transmitter 402, a receiver 412, and a reflector 408. System 400 can additionally include an attenuator, though not illustrated in FIG. 4 so as not to obscure embodiments of the present disclosure.

In accordance with one or more embodiments of the present disclosure, the transmitter 402 can direct a signal 404 towards the reflector 408 through the belt 406. As shown in FIG. 4, the signal 404 penetrates the belt 406 at an area defined by an entry footprint 416. Subsequently, the signal 404 reflects off of the reflector 408 and passes back through the belt 406 at an area defined by an exit footprint 418. The reflected signal (shown as reflected signal 404-3) can then be received by the receiver 412.

It is noted that the entry footprint 416 and the exit footprint 418 are separated by a particular distance of the belt 406. The distance can be defined based on a speed of the belt and/or an angle of the signal. Such a distance can be selected such that a portion of the signal 404 reflected from a top surface of the belt 406 is prevented from being received by the receiver 412 and corrupting thickness determination(s).

The process of steering the signal 404 to a particular entry footprint on the belt 406 can be carried out across the width of the belt 406. As shown by a plurality of entry footprints on the belt 406, and by the reference footprint 414, an entire width of the belt can be scanned. Such scanning be continued in a cyclical manner (e.g., at approximately 100 Hertz). That is, the belt 406 can be "swept" from one side to an opposing side by the signal (and back again) in a cyclical manner. As the belt 406 travels, the sweeping of the signal can yield a triangular (e.g., zig-zag) pattern along the belt 406 where its thickness has been determined. In some embodiments, each entry footprint can have dimensions of approximately 8.8 by 44 centimeters, though embodiments of the present disclosure are not so limited.

In some embodiments, a mapping of the thickness of a conveyor belt can be created (e.g., along an entire length and width of the belt). For example, a speed of the belt movement can be determined and/or known, and a particular portion (e.g., "beginning") of the belt can be determined and/or registered. In an example, a set of metal strips can be embedded in a bottom surface of the belt at a particular location. Radar systems in accordance with one or more embodiments of the present disclosure can determine that less energy is transmitted through the belt at that location and associate that location with a "starting point" for mapping the thickness of the belt along its length. The mapping of the belt can be stored in memory, for instance, and can be used to generate a graphical rendering of the thickness of the entire belt.

Figure 5:
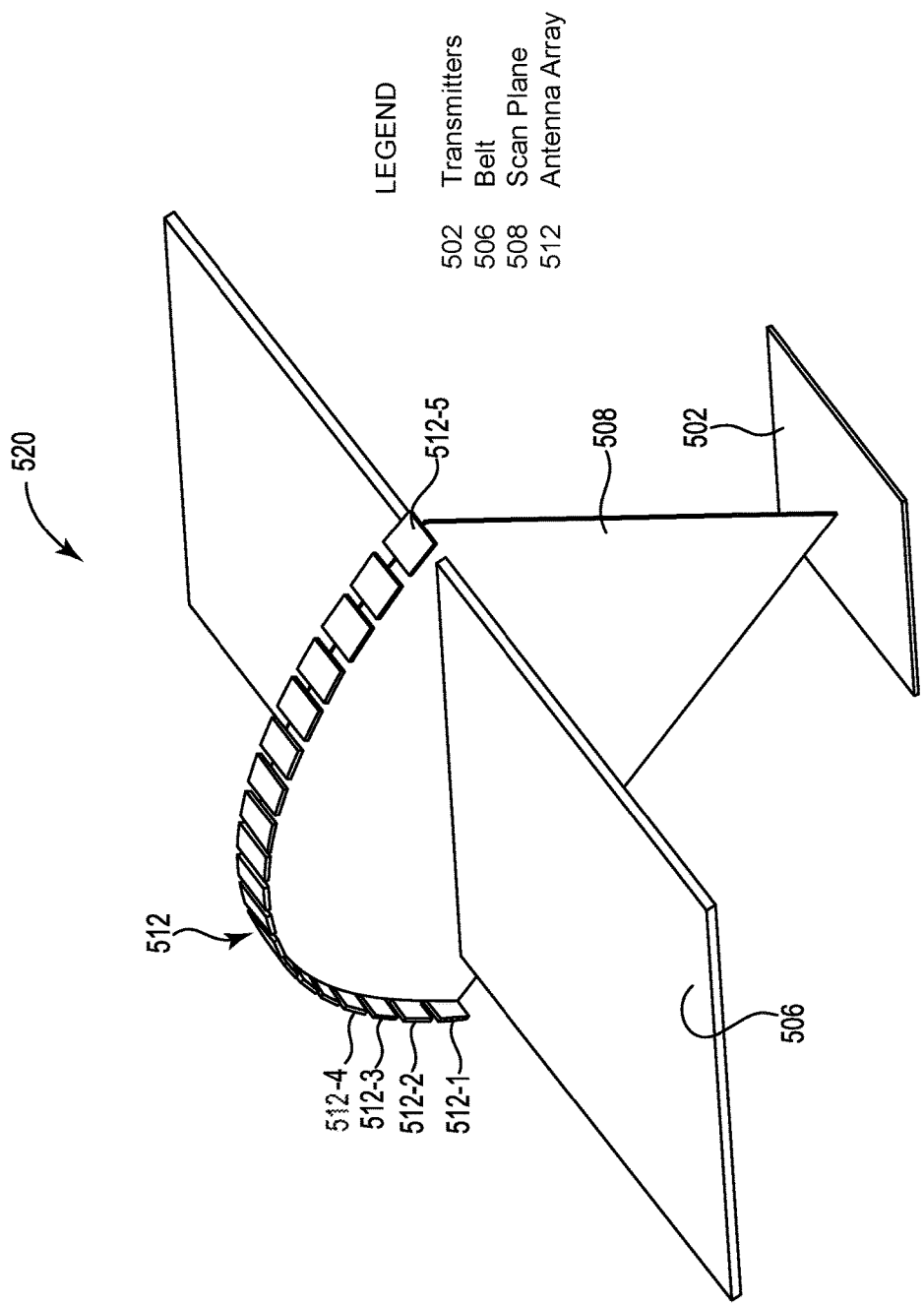
FIG. 5 illustrates a perspective view of a system for monitoring conveyor belt thickness in accordance with one or more embodiments of the present disclosure.

FIG. 5 illustrates a perspective view of a system 520 for monitoring conveyor belt thickness in accordance with one or more embodiments of the present disclosure. As shown in FIG. 5, system 520 includes a transmitter 502 and an antenna array 512 positioned on opposing sides of a conveyor belt 506. In the example illustrated in FIG. 5, the conveyor belt has a width of 2 meters, though embodiments herein are not limited to a particular width and/or thickness of conveyor belt. The conveyor belt 506 is not intended to be limited to a particular type of conveyor belt. In addition, it is noted that while the example of a conveyor belt is used herein for the purposes of illustration, embodiments of the present disclosure can monitor thicknesses of objects other than conveyor belts, as previously discussed.

The transmitter 502 can be a phased array antenna, for instance, having a plurality of radiating elements with a phase shifter. In some embodiments, the transmitter 502 can be a 10 GHz transmitter, though embodiments of the present disclosure are not so limited. For example, in some embodiments, frequencies between 2.4 to 77 GHz can be used. Higher frequencies may result in improved spatial and/or thickness resolution, but may be limited by attenuation with thicker materials.

A plurality of beams can be formed by shifting the phase of a signal emitted from each radiating element such that the beams are directed in a desired direction. The beams can be radio frequency (RF) beams, for instance, though embodiments of the present disclosure are not so limited. The cumulative paths of the plurality of beams are represented in FIG. 5 by the scan plane 508. Each beam can have a particular divergence angle (e.g., two degrees). The transmitter 502 can be positioned at a particular distance from the conveyor belt 506. In some embodiments, the distance is 12 inches, though embodiments herein are not so limited.

The antenna array 512 can include a plurality of receiving antennas. In the example illustrated in FIG. 5, the antenna array 512 includes 19 antennas, though embodiments herein are not so limited. Each of the antennas of the antenna array 512 can be located at a same distance from a source of the beam (i.e., the transmitter 502). That is, the antennas of the antenna array 512 can be positioned in a semicircular arrangement.

In accordance with one or more embodiments of the present disclosure, the transmitter 502 can direct a beam towards an antenna of the antenna array 512. For example, the transmitter 502 can direct an RF beam towards the antenna 512-2 of the antenna array 512. As the beam passes through the conveyor belt 506, the RF wave is slowed down and is subsequently received by the antenna 512-2. The operation of the system 520 is based on the slowing of the RF wave in the belt material being inversely proportional to the square root of the dielectric constant (e.g., permittivity) of the material. That is, the wave arrives at the antenna 512-2 with more phase delay than it would if it did not pass through the conveyor belt 506. Further, the slowing down of the RF beam causes a phase shift with respect to the RF beam transmitted over the same distance but without the belt present; the level of phase delay can be proportional to a thickness of the conveyor belt 506.

In some embodiments, a distance between the transmitter 502 and the antenna array 512 is fixed and is known. In some embodiments, a dielectric constant of the conveyor belt 506 is known.

To determine an unknown dielectric constant of the conveyor belt 506 (e.g., to calibrate the system 520 to the conveyor belt 506), embodiments of the present disclosure can insert a portion of the conveyor belt 506 having a known thickness into the scan plan 508. The phase delay resulting from the beam passing through the conveyor belt 506 can be used to determine the dielectric constant of the material comprising the conveyor belt 506. That is, if the distance between the transmitter 502 and the antenna array 512, as well as the dielectric constant, do not change, the determined phase delay can be proportional, and thus converted, into the belt thickness for another portion of the conveyor belt 506.

Since the reference RF beam that is travelling over the same distance but without the belt is required for calibration that measurement can be carried out using an antenna of the antenna array 504 that is located beyond the edge of the conveyor belt 506 (e.g., such that the conveyor belt 506 is not between the antenna and the transmitter 502). In the example illustrated in FIG. 5, that antenna is illustrated as antenna 512-5. Beyond the other edge of the belt the antenna 512-1 does not have the belt present in the RF beam path and could be used for the calibration of the dielectric constant. It is noted that a sample portion of the conveyor belt 506 (e.g., a remnant, scrap, test sample, etc.) can be placed between the antenna 512-1 and the transmitter 502, though is not shown in FIG. 5 so as not to obscure embodiments of the present disclosure. The calibrations using the sample portion of the conveyor belt, 506 antenna 512-6, and antenna 512-1 can be carried out periodically or on a scheduled basis, for instance, to determine a dielectric constant of the conveyor belt 506 at different temperatures and/or other conditions (e.g., humidity levels, atmospheric conditions, etc.).

Embodiments of the present disclosure can calibrate the system 520 to the conveyor belt 506 using a portion of the conveyor belt 506 proximal to an edge of the conveyor belt 506. Such a portion may, for instance, experience reduced wear than a medial portion of the conveyor belt 506 and may thus act as a suitable sample for calibration purposes.

The thickness of the conveyor belt 506 can be determined as the conveyor belt 506 moves, for instance. In some embodiments, the beam from the transmitter 502 can be directed at different antennas of the antenna array 512 in a particular sequence. That is, a thickness of the conveyor belt 506 can be determined across its entire width by sweeping the beam across the antenna array 512.

For example, the transmitter 502 can direct the beam at a first antenna (e.g., antenna 512-2) at a first time. While the beam is directed at the first antenna, adjacent antennas (e.g., antenna 512-1 and/or 512-3) can be deactivated (e.g., switched off). Deactivating additional antennas can allow embodiments of the present disclosure to ensure that only the beam passing through a desired portion of the conveyor belt 506 is received and read by the antenna without contributions from other receiving antennas. Subsequently, the transmitter 502 can direct the beam at a second antenna (e.g., antenna 512-3) adjacent to the first antenna. While the beam is directed at the second antenna, antennas adjacent to the second antenna (e.g., antenna 512-2 and/or antenna 512-4) can be deactivated. It is noted that antennas in addition to adjacent antennas can also be deactivated.

The process of activating sequential antennas of the antenna array 512 can be continued in a cyclical manner (e.g., at approximately 100 Hertz). That is, the conveyor belt 506 can be "swept" from one side to an opposing side by the beam (and back again) in a cyclical manner. As the conveyor belt 506 travels, the sweeping of the beam can yield a triangular (e.g., zig-zag) pattern along the conveyor belt 506 where its thickness has been determined.

Figure 6:
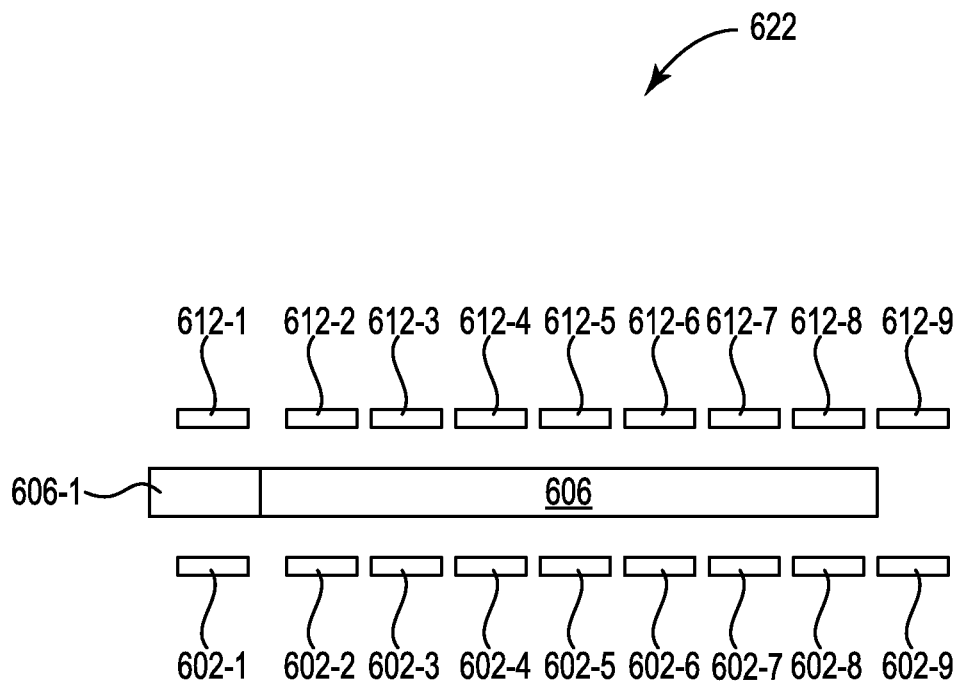
FIG. 6 illustrates a cross-sectional view of a system for monitoring conveyor belt thickness in accordance with one or more embodiments of the present disclosure.

FIG. 6 illustrates a cross-sectional view of another system 622 for monitoring conveyor belt thickness in accordance with one or more embodiments of the present disclosure. The system 622 includes a plurality of transmitters (i.e., a transmitter 602-1, a transmitter 602-2, a transmitter 602-3, a transmitter 602-4, a transmitter 602-5, a transmitter 602-6, a transmitter 602-7, a transmitter 602-8, and a transmitter 602-9, collectively referred to as "transmitters 602"). The transmitters 602 can be arranged in a substantially linear arrangement. The transmitters 602 can be configured to direct RF beams in a substantially equivalent direction.

The system 610 can include a plurality of antennas (i.e., an antenna 612-1, an antenna 612-2, an antenna 612-3, an antenna 612-4, an antenna 612-5, an antenna 612-6, an antenna 612-7, an antenna 612-8, and an antenna 612-9, collectively referred to as "antennas 612" and/or "antenna array 612"). The antennas 612 can be positioned on a side of a conveyor belt 606 opposing the transmitters 602. The antennas 612 can be arranged in a substantially linear arrangement. The antennas 612 can be configured to receive RF beams from a substantially equivalent direction.

As shown in FIG. 6, the antennas 612 and the transmitters 602 can be positioned such that they oppose each other. Each antenna can be associated with a respective transmitter; that is, each antenna can be configured to receive a beam from a single transmitter. For example, the antenna 612-4 can be configured to receive a beam from the transmitter 602-4. In some embodiments, more than one antenna can be configured to receive a beam from a single transmitter. Though nine antennas 612 and nine transmitters 602 are illustrated in FIG. 6, embodiments of the present disclosure are not limited to particular numbers of antennas 612 and/or transmitters 602.

In some embodiments, the antennas 612 and/or the transmitters 602 can be affixed to a support device (not shown so as not to obscure embodiments of the present disclosure). The support device can be a frame, for instance, or other device that maintains a fixed position of the antennas 612 and/or the transmitters 602. The support device can be installed such that the antennas 612 and the transmitters 602 can be placed on opposing sides of the conveyor belt 606 without interruption of the operation and/or movement of the conveyor belt 606.

Each beam directed towards an antenna by a respective transmitter of the system 610 can have a particular divergence angle (e.g., ten degrees). The transmitters 602 and receivers 612 can be positioned at a particular distance from the conveyor belt 606. In some embodiments, the transmitter distance is 12 inches and receiver distance is 5 inches, though embodiments herein are not so limited.

Each of the antennas 612 can be located at a same distance from a respective one of the transmitters 602. For example, the antenna 612-6 can be positioned a same distance from the transmitter 602-6 as the antenna 612-9 is from the transmitter 602-9.

In a manner analogous to that previously discussed, each of the transmitters 602 can direct a beam towards its counterpart antenna of the plurality of antennas 612. As the beam passes through the conveyor belt 606, the RF wave is slowed down and is received by the antenna. The operation of the system 622 is based on the slowing of the RF wave in the belt material being inversely proportional to the square root of the dielectric constant (e.g., permittivity) of the material. That is, the wave arrives at the antennas 612 with more phase delay than it would if it did not pass through the conveyor belt 606. Further, the level of phase delay can be proportional to a thickness of the conveyor belt 606.

As previously discussed, a distance between the transmitters 602 and the antennas 612 can be fixed and known. In some embodiments, a dielectric constant of the conveyor belt may be 606 is known.

The system 622 can allow the determination of a dielectric constant of the conveyor belt 606 and/or distance between antennas 602 and 612 in a manner analogous to that previously discussed in connection with FIG. 5. For instance, a portion (e.g., a sample portion) 606-1 of the conveyor belt 606 having a known thickness can be inserted between an antenna and a transmitter of the system 622 beyond the edge of the conveyor belt 606, shown in FIG. 6 as the antenna 612-1 and the transmitter 602-1. The phase delay resulting from the beam directed by the transmitter 602-1 passing through the conveyor belt 606 can be used to determine the dielectric constant of the material comprising the conveyor belt 606. That is, if the distance between the transmitter 602-1 and the antenna 612-1, as well as the dielectric constant, do not change, the determined phase delay can be proportional, and thus converted, into the belt thickness for another portion of the conveyor belt 606. In some embodiments, the distance between the transmitters 602 and the antennas 612 can be determined by the antenna 612-9 and the transmitter 602-9.

The calibration using the portion 606-1 of the conveyor belt 606 can be carried out periodically or on a scheduled basis, for instance, to determine a dielectric constant of the conveyor belt 606 at different temperatures and/or other conditions (e.g., humidity levels, atmospheric conditions, etc.).

Embodiments of the present disclosure can calibrate the system 610 to the conveyor belt 606 using a portion of the conveyor belt 606 proximal to an edge of the conveyor belt 606. Such a portion may, for instance, experience reduced wear than a medial portion of the conveyor belt 606 and may thus act as a suitable sample for calibration purposes. For example, such a portion may be a portion between the transmitter 602-8 and the antenna 612-8.

In some embodiments, an antenna of the antennas 612 and another transmitter of the transmitters 602 located beyond the edge of the conveyor belt 606 (shown as the antenna 612-9 and the transmitter 602-9) can be used to determine the reference distance between transmitters 602 and antennas 612. In such embodiments, there may not be a sample portion 606-1 of the conveyor belt 606 between the antenna 612-9 and the transmitter 602-9. Calibration of the system 610 with respect to the distance between the antennas and transmitters can allow increased accuracy in the face of changing temperature and/or weather conditions, for instance.

The thickness of the conveyor belt 606 can be determined as the conveyor belt 606 moves, for instance. In some embodiments, the transmitters may be individually activated at different times according to a particular sequence. That is, a thickness of the conveyor belt 606 can be determined across its entire width by sequentially activating one of the transmitters 602 at a time.

For example, a first transmitter, such as the transmitter 602-2, can direct a beam at a corresponding antenna, the antenna 612-2, at a first time. While the beam from the transmitter 602-2 is directed at the antenna 612-2, adjacent antennas (e.g., antenna 612-1 and/or 612-3) and/or adjacent transmitters (e.g., transmitter 602-1 and/or 602-3) can be deactivated (e.g., switched off). Deactivating additional antennas and/or transmitters can allow embodiments of the present disclosure to ensure that only the beam passing through a desired portion of the conveyor belt 606 is received and read by a corresponding antenna. Subsequently, a second transmitter, such as the transmitter 602-3, can direct a beam at a corresponding antenna, the antenna 612-3, adjacent to the first antenna. While the beam is directed at the second antenna, antennas adjacent to the second antenna (i.e., antenna 612-2 and/or antenna 612-4) and/or transmitters adjacent to the second transmitter (i.e., transmitter 602-2 and/or transmitter 612-4) can be deactivated. It is noted that antennas and/or transmitters, in addition to adjacent antennas and/or transmitters, can also be deactivated.

The process of activating sequential antennas 612 and/or transmitters 602 can be continued in a cyclical manner (e.g., at approximately 100 Hertz). That is, the conveyor belt 606 can be "swept" from one side to an opposing side (and back again) by substantially parallel beams that are substantially orthogonal to the conveyor belt 606 in a cyclical manner. As the conveyor belt 606 travels, the areas where the thickness of the conveyor belt 606 was determined can yield a sinusoidal pattern.

FIG. 7 illustrates a computing device 724 for monitoring conveyor belt thickness in accordance with one or more embodiments of the present disclosure. The computing device 724 can be, for example, a handheld network analyzer, laptop computer, desktop computer, or a mobile device (e.g., a mobile phone, a personal digital assistant, etc.), among other types of computing devices.

As shown in FIG. 3, the computing device 314 includes a memory 726 and a processor 728 coupled to memory 726. The memory 726 can be any type of storage medium that can be accessed by processor 728 to perform various examples of the present disclosure. For example, the memory 726 can be a non-transitory computer readable medium having computer readable instructions (e.g., computer program instructions) stored thereon that are executable by processor the 728 to control the operation of one or more transmitters and/or receivers in accordance with one or more embodiments of the present disclosure.

The memory 726 can be volatile or nonvolatile memory. The memory 726 can also be removable (e.g., portable) memory, or non-removable (e.g., internal) memory. For example, the memory 726 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although the memory 726 is illustrated as being located in the computing device 724, embodiments of the present disclosure are not so limited. For example, the memory 726 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for monitoring thickness uniformity, comprising:
    a transmitter positioned to transmit a signal through a portion of a plurality of portions of a material, wherein the material is moving;
    an attenuator configured to absorb a first portion of the transmitted signal;
    a reflector configured to reflect a second portion of the transmitted signal;
    a receiver configured to receive the reflected signal; and
    a computing device configured to determine a thickness of the portion of the material based on a time delay between the transmission of the signal and the reception of the reflected signal,
    wherein the transmitter is configured to transmit a respective signal through each of the plurality of portions of the material across a width of the material.

2. The system of claim 1, wherein the material is a conveyor belt.

3. The system of claim 1, wherein the transmitter and the reflector are located on opposing sides of the portion of the material.

4. The system of claim 1, wherein the transmitter and the reflector are located on a same side of the portion of the material.

5. The system of claim 1, wherein the first portion of the transmitted signal corresponds to a portion of the transmitted signal reflected towards the attenuator by a surface of the material.

6. The system of claim 1, wherein the computing device is configured to determine the thickness of the material based on:
    the time delay between the transmission of the signal and the reception of the reflected signal; and
    a time delay between a transmission of a second signal and a reception of the reflected second signal, wherein the second signal does not pass through the portion of the material.

7. The system of claim 6, wherein the transmitter is configured to transmit the second signal towards a portion of the reflector beyond an outer edge of the portion of the material.

8. The system of claim 2, wherein the conveyor belt includes a metal reinforcement, and wherein the transmitted signal is reflected off of the metal reinforcement before being reflected by the reflector.

9. The system of claim 1, wherein a surface of the reflector has a radius of curvature configured to focus the reflected signal.

10. A system for monitoring thickness uniformity, comprising:
    a plurality of transmitters on a first side of a conveyor belt, each positioned to transmit a respective signal through a respective portion of the conveyor belt, wherein the conveyor belt is moving;
    a plurality of antennas on a second side of the conveyor belt, each configured to receive a respective one of the signals;
    a particular transmitter located beyond an edge of the conveyor belt and a particular antenna located beyond the edge of the conveyor belt; and
    a computing device configured to determine a reference distance between the plurality of transmitters and the plurality of antennas using the particular transmitter and the particular antenna and determine a respective thickness of each portion of the conveyor belt based on a time delay between the transmission of the signals and the reception of the signals.

11. The system of claim 10, wherein the plurality of transmitters are arranged in a substantially linear arrangement and wherein the plurality of antennas are arranged in a substantially linear arrangement.

12. The system of claim 10, wherein each of the plurality of antennas is located at a same distance from a respective one of the plurality of transmitters.

13. The system of claim 10, wherein the computing device is configured to individually activate each of the plurality of transmitters at a respective time according to a sequence.

14. The system of claim 13, wherein the computing device is configured to deactivate an antenna adjacent to an antenna receiving a signal from an activated transmitter.

15. A system for monitoring thickness uniformity, comprising:
   a plurality of antennas on a first side of a conveyor belt;
   a transmitter on a second side of the conveyor belt and separated from each of the plurality of antennas by a same distance, wherein the transmitter is positioned to transmit a signal through the conveyor belt at a first antenna of the plurality of antennas at a first time, wherein the conveyor belt is moving; and
   a computing device configured to determine a thickness of the conveyor belt between the transmitter and the first antenna based on a time delay between the transmission of the signal and the reception of the signal by the first antenna, wherein the computing device is configured to calibrate the system based on a time delay between a transmission of the signal and a reception of the signal by an antenna of the plurality of antennas corresponding to an outer edge of the conveyor belt.

16. The system of claim 15, wherein the transmitter is configured to transmit the signal through the conveyor belt at a second antenna of the plurality of antennas at a second time, and wherein the computing device is configured to determine a thickness of the conveyor belt between the transmitter and the second antenna based on a time delay between the transmission of the signal and the reception of the signal by the second antenna.

17. The system of claim 16, wherein the first antenna is deactivated while the transmitter is transmitting the signal through the conveyor belt at the second antenna.

* * * * *